United States Patent [19]

Hamren

[11] 4,373,497
[45] Feb. 15, 1983

[54] EXHAUST GAS RECIRCULATION CONTROL

[75] Inventor: Glen C. Hamren, Greentown, Ind.

[73] Assignee: General Motors Corporation, Detroit, Mich.

[21] Appl. No.: 303,949

[22] Filed: Sep. 21, 1981

[51] Int. Cl.³ .......................................... F02M 25/06
[52] U.S. Cl. ..................................... 123/571; 123/569
[58] Field of Search ....................... 123/571, 569, 568

[56] References Cited

U.S. PATENT DOCUMENTS 3,915,134 10/1975 Young et al. ........................ 123/571
4,230,080 10/1980 Stumpp et al. ...................... 123/568

OTHER PUBLICATIONS

Automotive Engineering, Jul. 1978, vol. 86, No. 7, pp. 46-51.

*Primary Examiner*—Wendell E. Burns
*Attorney, Agent, or Firm*—Howard N. Conkey

[57] ABSTRACT

An exhaust gas recirculation control system variably controls the amount of exhaust gas recirculated to a diesel engine in accord with the quantity of fuel supplied per engine revolution between a maximum amount at a first predetermined quantity of fuel per revolution and a minimum amount at a second predetermined quantity of fuel per revolution. The system maintains a substantially constant relationship between the exhaust gas recirculation amount and the quantity of fuel injected for each revolution over the speed range of the engine even though the fuel control element positions providing the first and second predetermined values of fuel quantity per revolution each increases at different rates as a function of increasing engine speeds.

3 Claims, 4 Drawing Figures

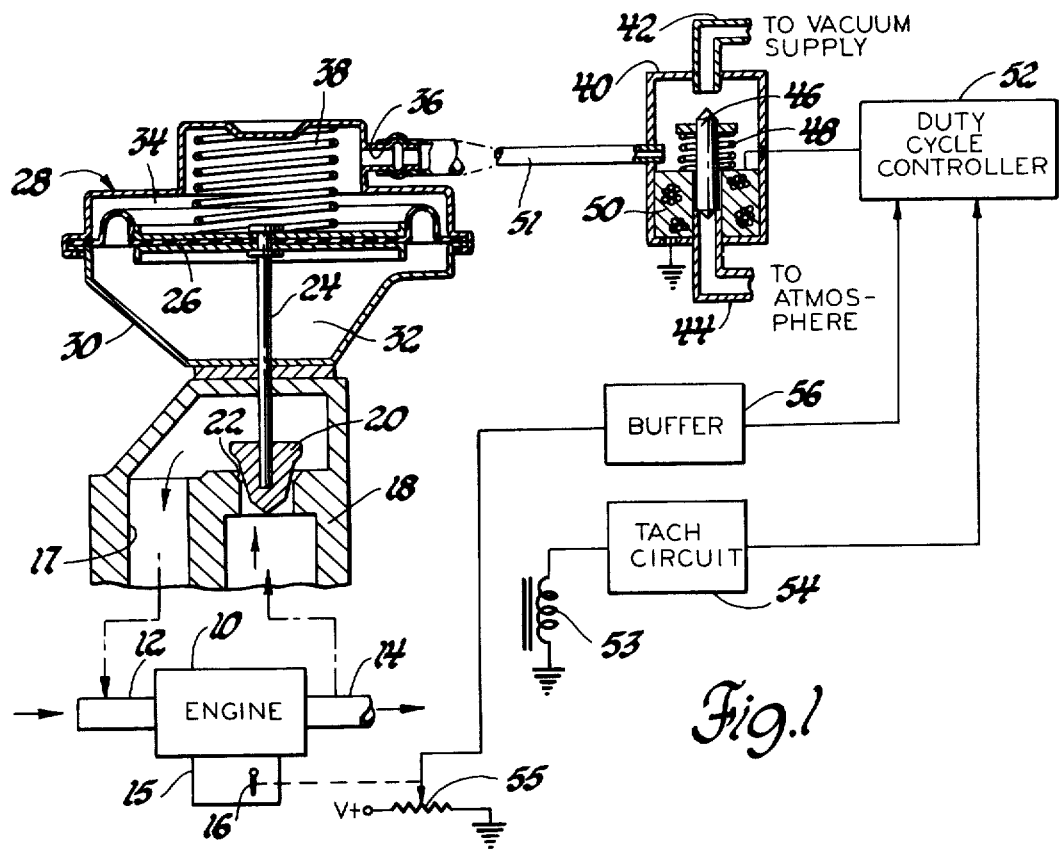
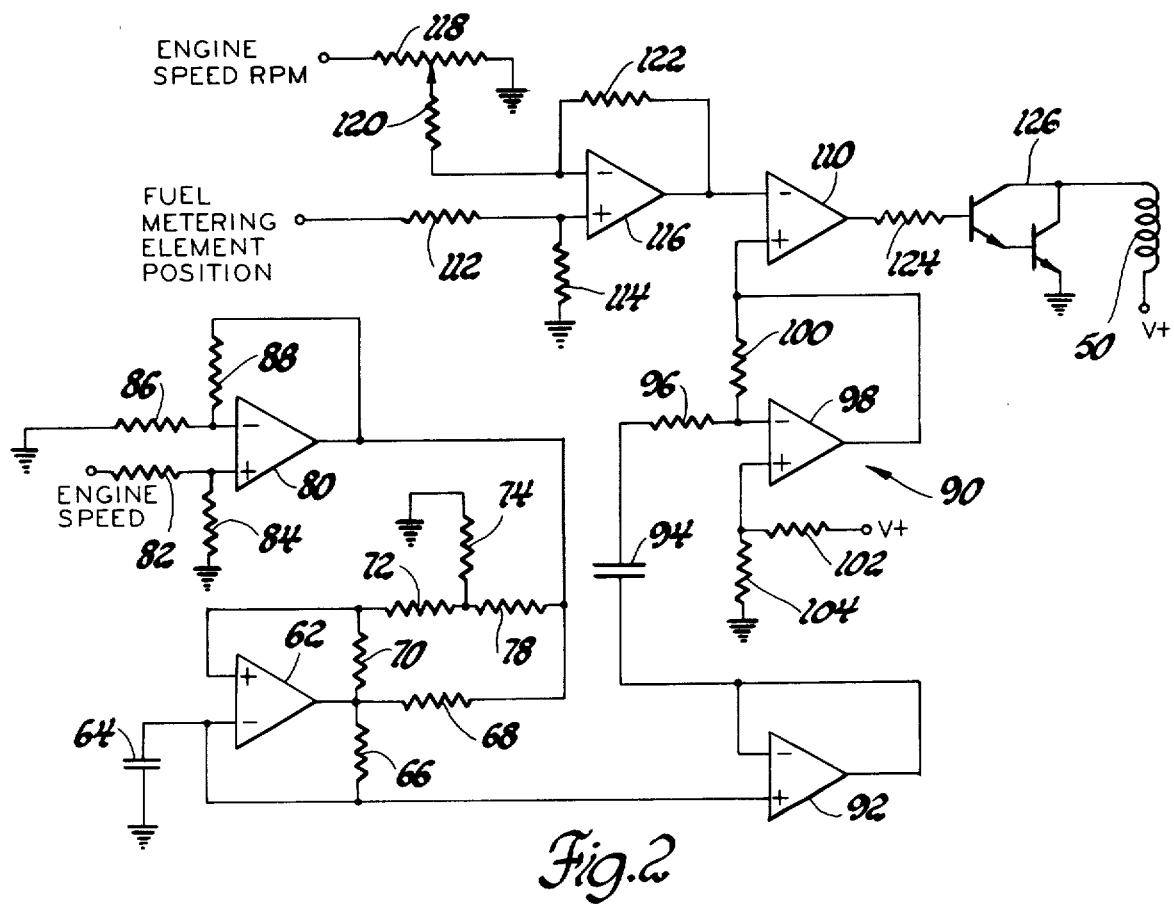

EXHAUST GAS RECIRCULATION CONTROL

This invention relates to exhaust gas recirculation systems for motor vehicle internal combustion engines.

The amount of nitrogen oxides formed in the combustion chamber of a diesel engine is directly related to the local temperature and the local oxygen supply. Diesel engines inherently run at air/fuel ratios considerably above the stoichiometric air/fuel ratio, especially when operated at less than full load. If EGR is employed to replace some of this excess air with exhaust gases, nitrogen oxides can be significantly reduced. Because the specific heat of exhaust gases is greater than that of air, EGR increases the heat absorbing capacity of the cylinder intake charge. This heat absorption holds down the combustion temperatures and thereby inhibits nitrogen oxide formation. EGR also decreases the overall oxygen content of the cylinder intake charge. This lowers nitrogen oxide formation by directly reducing one of the constituent elements of nitrogen oxides.

In general, the more EGR, the less nitrogen oxides. However, at some point, a further increase in the amount of exhaust gas recirculation or an increase in the fuel injected into the cylinder and resulting decrease in the air-to-fuel ratio is accompanied by unacceptable increases in hydrocarbon, carbon monoxide and particulate emissions. Accordingly, above this air/fuel ratio limit, it is desirable to reduce the EGR percentage of the cylinder intake gas charge to minimize the formation of those emissions.

In some prior systems EGR has been controlled as a function of the quantity of fuel injected into the cylinder at each injection event (or fuel per engine revolution) as measured by the position of the fuel metering element of the fuel injection pump in order to provide a constant predetermined percent EGR for each quantity of fuel injected. However, this form of control assumes that the amount of fuel injected for each injection event remains constant for each position of the fuel metering element over the speed range of the diesel engine. If there is a variance in the amount of fuel injected for each injection event as the engine speed varies, the amount of EGR is not changed accordingly so that the percentage EGR deviates from the desired amount. For example, in certain fuel injection pumps, it is typical that the amount of fuel injected for each injection event at a given fuel metering valve position decreases as engine speed increases. Further, it is typical in these fuel injection pumps for the position of the fuel metering valve providing a first value of fuel quantity for each injection event and the position of the fuel metering element providing a second quantity to vary at different rates as a function of increasing speed through the major portion of the speed range of the diesel engine. When the fuel injection pump exhibits these characteristics, controlling the amount of exhaust gas recirculation strictly as a function of the fuel metering element position does not provide the desired constant EGR amount for each fuel injection quantity over the speed range of the diesel engine.

It is the general object of this invention to provide an improved EGR control system for a diesel engine employing a fuel injection pump having fuel metering valve-fuel supply characteristics varying over the speed range of the diesel engine.

It is another object of this invention to provide an improved EGR control system for a diesel engine for controlling the EGR amount in response to the position of the fuel metering element position adjusted by the value of engine speed to provide for a predetermined constant EGR amount for each fuel injection quantity per engine revolution even though the fuel metering valve position for maintaining a constant fuel amount per engine revolution varies with engine speed and at varying rates depending upon the fuel amount provided.

These and other objects of this invention may be best understood by reference to the following description of a preferred embodiment and the drawings in which:

FIG. 1 illustrates an exhaust gas recirculation system employing the principles of this invention;

FIG. 2 shows an embodiment of the solenoid duty cycle controller of FIG. 1 for controlling EGR in accord with the principles of this invention;

Figure 3:
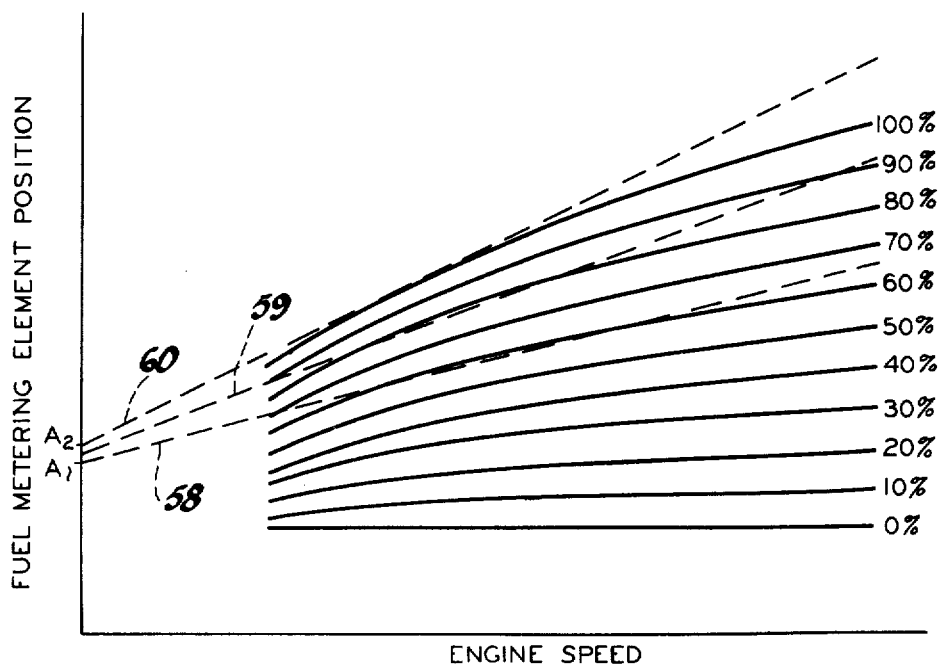
FIG. 3 shows a graphical representation of the relationships between the fuel metering valve position of a fuel injection pump, engine speed and fuel flow values.

Referring to FIG. 1, a motor vehicle diesel engine 10 includes an intake air induction passage 12 and an exhaust passage 14. A conventional fuel injection pump 15 injects a quantity of fuel into the cylinders of the engine. The quantity of fuel injected is controlled by movement of a fuel metering element 16 which may take the form of a fuel metering valve the rotational position of which regulates the fuel quantity per injection event. An exhaust gas recirculation (EGR) passage 17 extends from the exhaust passage 14 through an EGR valve body 18 to the induction passage 12.

A valve member 20 is movable relative to a valve seat 22 in the EGR passage 17 for controlling the flow of recirculated exhaust gases from the exhaust passage 14 to the induction passage 12. The valve member 20 is movable against the valve seat 22 to inhibit EGR and is movable away from the valve seat 22 to permit a variable flow of recirculated exhaust gases from the exhaust passage 14 to the induction passage 12. The valve member 20 is attached by a stem 24 to a flexible diaphragm 26 of a differential pressure type valve actuation motor 28. The motor 28 comprises a can 30 divided by the diaphragm 26 into a lower chamber 32 vented to atmospheric pressure and an upper chamber 34 with a port 36 opened to a source of control vacuum. A spring 38 in the upper chamber 34 between the diaphragm 26 and the can 30 biases the valve member 20 toward engagement with the valve seat 22.

The diaphragm 26 and the attached valve member 20 are moved against the force of the spring 38 by the application of vacuum through the port 36 into the chamber 34. The position of the diaphragm 26 and the valve member 20 and the area of the valve opening formed by the valve member 20 and the valve seat 22 are dependent upon the vacuum level applied to the chamber 34. By variably controlling the vacuum level in the chamber 34, the effective orifice area formed by the valve member 20 and the valve seat 22 is controlled to control the amount of exhaust gases recirculated from the exhaust passage 14 to the induction passage 12. Since the pressure in the induction passage is substantially constant at atmospheric pressure and the exhaust back pressure in the exhaust passage 14 is proportional to gas flow into the engine, a constant percent EGR is provided at all engine speeds for a constant opening of the valve member 20. By controlling the vacuum level in the chamber 34, the percent EGR or, in other words, the EGR amount for each cylinder intake event in the engine 10 is controlled. Since the total gas charge per cylinder in the engine 10 is substantially constant (the pressure in the induction passage being substantially constant), control of the percent EGR is effectively a control of the air/fuel ratio for a given fuel charge per cylinder. Therefore, for each fuel quantity supplied to the engine 10 for each engine revolution, the EGR amount can be scheduled which is determined to produce an air/fuel ratio resulting in the desired emission reduction or vehicle performance.

The vacuum level in the chamber 34 is variably controlled by a transducer 40 energized by a duty cycle modulated signal to control the amount of exhaust gas recirculated from the exhaust passage 14 to the induction passage 12. Vacuum from a vacuum supply is admitted to the transducer 40 through a conduit 42. The vacuum supply may be provided by means of a vacuum accumulator charged by a vacuum pump driven by the diesel engine 10. Atmospheric air is admitted to the transducer 40 through a conduit 44. A valve member 46 is biased by a spring 48 to a position closing the vacuum inlet to the transducer 40 and opening the atmospheric inlet. The valve member 46 is moved against the bias of the spring 48 by a solenoid winding 50, when energized, to close the atmospheric inlet to the transducer 40 and to open the vacuum inlet. The pressure in the transducer 40 is coupled to the chamber 34 in the motor 28 via a conduit 51.

The vacuum level in the chamber 34 is controlled to produce a desired EGR amount by controlling the relationship between the time that vacuum is admitted to the transducer 40 through the conduit 42 and the time that atmospheric air is admitted to the transducer 40 through the conduit 44. This time relationship is provided by periodically energizing the solenoid 50 with a controlled duty cycle modulated signal. The pressure in the chamber 34 may be varied from the pressure of the vacuum supply to atmospheric pressure by varying the duty cycle of repetitive energizing pulses from 100% to 0%.

The duty cycle modulated control signal for energizing the winding 50 is provided by a duty cycle controller 52 in response to engine speed and the position of the fuel metering element 16 of the fuel injection pump 15. The engine speed signal is provided by means of an induction speed pickup winding 53 that senses engine rotation. For example, the pickup winding 53 may sense rotation of the engine starter ring gear. Alternatively, an output of the vehicle alternator having a frequency related to engine speed may be utilized as an indicator of the engine speed. The output of the winding 53 is supplied to a conventional tachometer circuit 54 providing a speed signal to the controller 52 in the form of a DC voltage having a magnitude that linearly varies in direct proportion to engine speed.

The position of the fuel metering element 16 of the fuel injection pump 15 is monitored by means of a potentiometer 55 which provides a DC voltage to the controller 52 via a buffer amplifier 56 that linearly varies in direct proportion to the metering element position.

The fuel injection pump 15 is conventional in form and typically has fuel supply characteristics as illustrated in FIG. 3. The solid lines represent the percentage of the maximum fuel supplied per injection event as a function of the fuel metering element position signal and the engine speed signal. It has been previously suggested to control the EGR quantity solely as a function of the position of the fuel metering element 16. However, as can be seen from the curves of FIG. 3, the amount of fuel injected per injection event for a given position of the fuel metering element decreases with increasing engine speed. Therefore, if the EGR amount is controlled strictly as a function of the metering element position, the air/fuel ratio of the cylinder mixture will vary with varying engine speed. As also can be seen from FIG. 3, with increasing engine speed the fuel metering element positions required to maintain a constant fuel injection quantity per injection event increases with increasing engine speed at a rate different from the fuel metering element positions required to maintain another constant fuel injection quantity per injection event.

The dutyl cycle controller 52 of FIG. 1 and which is illustrated in FIG. 2 is responsive to the fuel metering element position and engine speed to provide for a scheduled EGR amount that is substantially constant with each value of fuel injection per injection event over the speed range of the vehicle. In the present embodiment it will be assumed that at fuel quantities per injection less than a first predetermined amount such as 60% of the maximum amount, maximum available EGR is desired and at the maximum fuel injection quantity per injection, no EGR is desired. Between these quantities, it is desired to modulate EGR between 0% and 100% in accord with the fuel quantity per injection. In FIG. 3, the fuel flow curves representing these two amounts (60% and 100%) are approximated by the dotted lines 58 and 60. The line 58 is defined by the expression $A_1 + K_1S$ where $A_1$ is the metering element position at zero engine speed, $K_1$ is the slope of the line 58 and S is engine speed. The line 58 represents the fuel quantity per injection event (60% of the maximum in this embodiment) below which it is desired to provide for maximum EGR. Line 60 is defined by the expression $A_2 + K_2S$ where $A_2$ is the metering element position at zero speed and $K_2$ is the slope of the line 60. The line 60 represents the maximum possible fuel quantity per injection event at which fuel quantity it is desired to inhibit EGR. Between these two fuel quantities, EGR is proportioned as a function of the amount of fuel supplied per injection event. The line 59 represents the average of the fuel quantity per injection represented by the lines 58 and 60 and is defined by the expression $(A_1+A_2)/2 + (K_1+K_2)S/2$ where $(A_1+A_2)/2$ is the metering element position at zero speed and $(K_1+K_2)/2$ is the slope of the line 59.

As can be seen from FIG. 3, the amount of change in position of the fuel metering element to provide control of EGR between minimum and maximum amounts varies with engine speed. In general, the circuit of FIG. 2 provides for a duty cycle modulated signal for controlling the winding 50 of the transducer 40 that varies between 0% and 100% duty cycle for fuel metering element positions between the curves 58 and 60 at each engine speed. This provides for a substantially constant relationship between the effective orifice area of the exhaust gas recirculation passage 17 represented by the position of the valve 20 relative to the valve seat 22 and the quantity of fuel injected for each injection event over the speed range of the diesel engine 10.

Referring to FIG. 2, an oscillator comprised of a comparator 62 having an open collector output, a capacitor 64 and resistors 66, 68, 70, 72, 74 and 78 generates an alternating signal approximately a triangular waveform. The peak-to-peak amplitude of this wave form is controlled as a function of engine speed so that it has a value equal to the difference between the curves 58 and 60 of FIG. 3. This is accomplished by an engine speed signal applied to the junction of the resistors 68 and 78. This signal is provided by an operational amplifier 80 and the gain controlling resistors 82, 84, 86 and 88. The engine speed signal from the tachometer circuit 56 of FIG. 1 is provided to the positive input of the amplifier 80 through the resistor 82. The gain of the amplifier circuit is such as to provide a triangular waveform across the capacitor 64 having a peak-to-peak value equal to the difference between the curves 58 and 60 of FIG. 3. This signal is applied to a DC biasing circuit 90 through a unity gain buffer amplifier 92 and a DC blocking capacitor 94. The signal applied to the DC biasing amplifier 90 through the capacitor 94 is a triangular waveform having the peak-to-peak amplitude equal to the difference between the value curves 58 and 60 at each engine speed. This signal is applied to the negative input of the DC biasing circuit 90 through a resistor 96.

The function of the DC biasing circuit 90 is to bias the alternating triangular waveform at a DC level that is equal to the value $(A_1+A_2)/2$ which is the zero engine speed intercept of the curve 59 of FIG. 3. This bias offset is provided by an operational amplifier 98 having a feedback resistor 100 and having a signal applied to the positive input thereof from a voltage divider comprised of the resistors 102 and 104 series coupled between a voltage supply B+ and ground. The resistors 102 and 104 are chosen so as to establish a DC bias on the output signal from the amplifier 98 equal to the value $(A_1+A_2)/2$.

Figure 4:
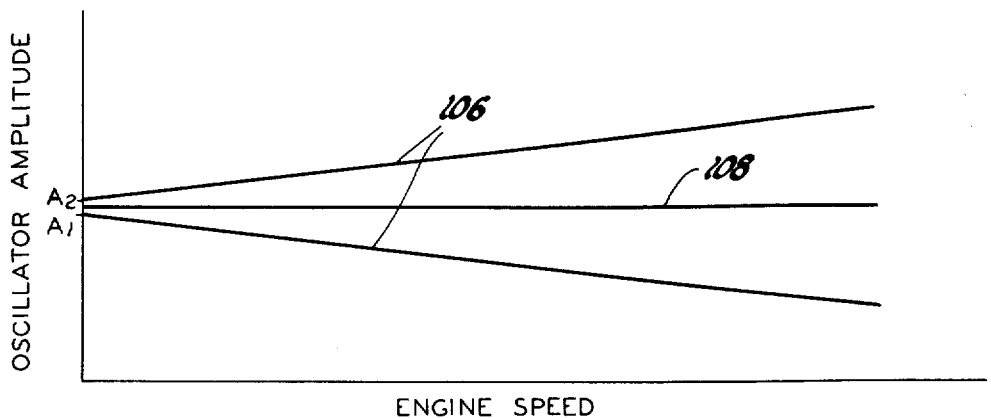
FIG. 4 shows a graphical representation of the output of the triangular wave generator of FIG. 2.

The output of the DC biasing circuit 90 is illustrated in FIG. 4. The lines 106 represent the envelope of the triangular waveform. The horizontal line 108 represents the DC bias provided by the biasing circuit 90 and has a value $(A_1+A_2)/2$. At each engine speed, the peak-to-peak amplitude of the triangular waveform between the lines 106 of FIG. 4 is equal to the difference between the curves 58 and 60 of FIG. 3. This amplitude represents the amount of change in fuel metering element position at each engine speed to change the fuel amount from the amount below which maximum EGR is provided and the maximum amount above which no EGR is provided and between which proportional EGR is provided.

The output of the DC bias circuit 90 is provided to the positive input of a comparator 110.

The voltage representing the fuel metering element position provided by the buffer amplifier 61 of FIG. 1 is applied across a pair of resistors 112 and 114. The voltage at the junction of these resistors and which is proportional to the fuel metering element position is applied to the positive input of an amplifier 116. A speed signal having a slope that is equal to $(K_1+K_2)/2$, the slope of curve 59 of FIG. 3, is generated by a potentiometer 118 across which the speed signal output of the tachometer circuit 56 of FIG. 1 is applied. The output of the potentiometer 118 is coupled to the negative input of the amplifier 116 through a resistor 120. A negative feedback resistor 122 is coupled between the negative input and the output of the amplifier 116. The speed signal applied to the negative input of the amplifier 116 adjusts the metering element position voltage to compensate for the slope of the curves 58 and 60 of FIG. 3.

The output of the amplifier 116 is applied to the negative input of the comparator 110 which compares it with the triangular waveform output applied to the positive input of the comparator 110 from the DC biasing circuit 90. The output of the amplifier 110 is a duty cycle modulated signal having a duty cycle varying between zero and 100% with positions of the fuel metering element 16 varying between the values represented by the curves 58 and 60 at each engine speed. This signal is applied through a resistor 124 to a Darlington driver 126. When the Darlington transistor 126 is biased conductive by a positive voltage output of the comparator 110, the solenoid winding 50 of the transducer 40 of FIG. 1 is energized to close the atmosphere input and to admit vacuum through the conduit 42 from the vacuum supply. When the output of the comparator 110 is at ground, the Darlington amplifier 126 is biased nonconductive and the solenoid winding 50 is deenergized so that the valve 46 in the transducer 40 is biased by the spring 48 to close the vacuum supply input and to admit atmospheric air through the conduit 44.

In operation of the circuit of FIG. 2, at all engine speeds, when the fuel metering element position is below the position represented by the curve 58, the negative input of the comparator 110 is less than the DC biased triangular waveform applied to its positive input. Therefore, its output is a continuous positive level (100% duty cycle) and the solenoid winding 50 is continuously energized. Accordingly, vacuum is applied continuously through the conduits 42 and 52 to move the diaphragm 26 against the spring 38 to open the valve member 20 to its maximum position to provide for maximum possible EGR. However, as the fuel metering element position increases from the value represented by the curve 58 at any engine speed, the negative input of the comparator 110 increases above the minimum value of the triangular waveform applied to its positive input so that the output of the comparator 110 decreases in duty cycle from 100% to decrease the vacuum level applied to the upper chamber 34 of the motor 28. The valve opening provided by the valve 20 and valve seat 22 is decreased with decreasing vacuum levels in the chamber 34 until the fuel metering element position exceeds the position represented by the curve 60. At this value, the signal applied to the negative input of the comparator 110 exceeds the maximum level of the triangular waveform applied to its positive input so that the solenoid winding 50 is maintained deenergized (0% duty cycle). When this condition exists, the vacuum input to the transducer 40 is maintained closed and the atmospheric input is maintained open. When this condition exists, the spring 38 moves the diaphragm to close the valve 20 against the valve seat 22 to inhibit EGR.

In the foregoing manner, at each engine speed, the EGR passage restriction and therefore the EGR percent is maintained substantially constant for a constant fuel injection amount per injection over the speed range of the engine.

The foregoing description of a preferred embodiment of the invention is not to be considered as limiting or restricting the invention, since many modifications may be made by the skill of the art without departing from the scope of the invention.

The embodiments of the invention in which an exclusive property or privilege is claimed are defined as follows:

1. In combination with a fuel injected internal combustion engine having an air induction passage through which air is inducted into the engine, an exhaust discharge passage, and a fuel injection pump including a variable position fuel control element for controlling the quantity of fuel injected per engine revolution, an exhaust gas recirculation control system for variably controlling the amount of exhaust gas recirculated in accord with the quantity of fuel per revolution between a maximum amount at a first predetermined quantity of fuel per revolution and a minimum amount at a second predetermined quantity of fuel per revolution, comprising:

an exhaust gas recirculation means effective to recirculate exhaust gases from the exhaust gas discharge passage to the air induction passage;

means effective to measure the engine speed;

means effective to measure the position of the fuel control element, the fuel control element positions providing the first and second predetermined values of fuel quantity per revolution each changing at different rates as a function of speed throughout at least a major portion of the speed range of the engine;

means effective to adjust the amount of exhaust gases recirculated through the exhaust gas recirculation means in response to the average value of a control signal; and means effective to vary the average value of the control signal between minimum and maximum values in response to variations in the position of the fuel control element, the rate of change of the average value of the control signal with varying positions of the fuel control element varying with engine speed inversely to the change in the range of positions of the fuel control element between the positions producing the first and second predetermined fuel quantities for each revolution, whereby the relationship between the exhaust gas recirculation amount and the quantity of fuel injected for each revolution is maintained substantially constant over the speed range of the engine.

2. In combination with a fuel injected internal combustion engine having an air induction passage through which air is inducted into the engine, an exhaust discharge passage, and a fuel injection pump including a variable position fuel control element for controlling the quantity of fuel injected for each injection event, an exhaust gas recirculation control system for variably controlling the amount of exhaust gas recirculated in accord with the quantity of fuel for each injection event between a maximum amount at a first predetermined quantity of fuel injected for each injection event and a minimum amount at a second predetermined quantity of fuel for each injection event, comprising:

an exhaust gas recirculation passage effective to recirculate exhaust gases from the exhaust gas discharge passage to the air induction passage;

a flow control valve in the exhaust gas recirculation passage effective to variably restrict the exhaust gas recirculation passage to control the amount of recirculated exhaust gases;

means effective to measure the engine speed;

means effective to measure the position of the fuel control element, the fuel control element positions providing the first and second predetermined values of fuel quantity for each injection event varying from one another and at different rates as a function of engine speed;

means effective to provide an exhaust gas recirculation control signal varying with at least the measured position of the fuel control element;

means effective to generate a substantially triangular shaped waveform;

means responsive to the measured engine speed effective to vary the amplitude of the triangular shaped waveform in accord with the predetermined variance with engine speed between the positions of the fuel control element providing the first and second predetermined values of fuel quantity for each injection event;

means responsive to the triangular shaped waveform and the exhaust gas recirculation control signal effective to provide a pulse width modulated signal, the signal width modulated signal having a duty cycle value varying between 0 and 100% at each engine speed as the fuel quantity for each injection event is varied between the first and second predetermined quantities by the fuel control element; and means responsive to the pulse width modulated signal effective to adjust the flow control valve in accord with the duty cycle value of the pulse width modulated signal, whereby the relationship between the exhaust gas recirculation passage restriction provided by the flow control valve and the quantity of fuel injected for each injection event is maintained substantially constant over the speed range of the engine.

3. In combination with a fuel injected internal combustion engine having an air induction passage through which air is inducted into the engine, an exhaust discharge passage, and an injection pump including a variable position fuel metering valve for controlling the quantity of fuel injected for each injection event, an exhaust gas recirculation control system for variably controlling the amount of exhaust gas recirculated in accord with the quantity of fuel for each injection event between a maximum amount at a first predetermined quantity of fuel injected for each injection event and a minimum amount at a second predetermined quantity of fuel for each injection event, comprising:

an exhaust gas recirculation passage effective to recirculate exhaust gases from the exhaust gas discharge passage to the air induction passage;

a flow control valve in the exhaust gas recirculation passage effective to variably restrict the exhaust gas recirculation passage to control the amount of recirculated exhaust gases;

means effective to measure the value S of the engine speed;

means effective to measure the value A of the fuel metering valve position, the metering valve position that provides the first predetermined value of fuel quantity for each injection event varying with engine speed substantially in accord with the expression $A_1 + K_1 S$ and the metering valve position providing the second predetermined value of fuel quantity for each injection event varying with engine speed substantially in accord with the expression $A_2 + A_2 S$, where $A_1$, $A_2$, $K_1$ and $K_2$ are constants and where $K_1$ and $K_2$ are unequal;

means effective to generate a substantially triangular shaped waveform having an alternating component with a peak-to-peak value substantially satisfying the expression $(A_2 + K_2 S) - (A_1 + K_1 S)$ and a DC component substantially satisfying the expression $(A_1+A_2)/2$;

means effective to generate an exhaust gas recirculation control signal having a value substantially satisfying the expression $A-(K_1+K_2)S/2$;

switch means effective to provide a pulse width modulated signal in accord with the sum of the triangular shaped waveform and the exhaust gas recirculation control signal; and means responsive to the pulse width modulated signal effective to adjust the flow control valve in accord with the value of the duty cycle signal, whereby the relationship between the exhaust gas recirculation passage restriction provided by the flow control valve and the quantity of fuel injected for each injection event is maintained substantially constant over the speed range of the engine.

* * * * *